United States Patent
Pursifull et al.

(10) Patent No.: US 9,518,541 B2
(45) Date of Patent: Dec. 13, 2016

(54) METHOD AND SYSTEM FOR INCREASING VACUUM GENERATION BY AN ENGINE

(71) Applicant: Ford Global Technologies, LLC, Dearborn, MI (US)

(72) Inventors: Ross Dykstra Pursifull, Dearborn, MI (US); Ralph Wayne Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/077,722

(22) Filed: Mar. 22, 2016

(65) Prior Publication Data

US 2016/0201626 A1    Jul. 14, 2016

Related U.S. Application Data

(62) Division of application No. 13/944,728, filed on Jul. 17, 2013, now Pat. No. 9,322,347.

(51) Int. Cl.
| | | |
|---|---|---|
| *F02B 1/00* | (2006.01) | |
| *F02M 43/00* | (2006.01) | |
| *F02D 41/00* | (2006.01) | |
| *F02D 41/12* | (2006.01) | |

(52) U.S. Cl.
CPC .......... *F02M 43/00* (2013.01); *F02D 41/0027* (2013.01); *F02D 41/0032* (2013.01); *F02D 41/12* (2013.01); *F02D 2041/001* (2013.01); *F02D 2250/41* (2013.01)

(58) Field of Classification Search
CPC ..................... F02B 2075/125; F02D 41/3094
USPC .......................... 123/294, 295, 429, 431, 525
See application file for complete search history.

(56) References Cited

U.S. PATENT DOCUMENTS

| | | | | |
|---|---|---|---|---|
| 3,672,339 | A * | 6/1972 | Lazar | F02M 7/106 123/444 |
| 4,363,373 | A * | 12/1982 | Haugeberg | B60K 31/08 123/360 |
| 4,373,493 | A * | 2/1983 | Welsh | F02M 13/08 123/525 |
| 4,388,912 | A * | 6/1983 | Kimura | F02D 11/08 123/568.27 |
| 4,501,709 | A * | 2/1985 | Yamamoto | F02M 9/1275 261/44.5 |
| 4,509,486 | A * | 4/1985 | Swift | F02M 69/048 123/453 |
| 6,446,939 | B1 * | 9/2002 | Hoppe | F02M 17/04 261/35 |
| 7,415,967 | B2 | 8/2008 | Trask et al. | |
| 2003/0230280 | A1 | 12/2003 | Allston et al. | |
| 2010/0012103 | A1 | 1/2010 | Lewis et al. | |
| 2014/0172275 | A1 | 6/2014 | Surnilla et al. | |
| 2014/0261301 | A1 * | 9/2014 | Leone | F02B 17/005 123/295 |
| 2014/0297159 | A1 | 10/2014 | Surnilla et al. | |
| 2014/0297162 | A1 | 10/2014 | Surnilla et al. | |
| 2015/0019106 | A1 | 1/2015 | Cunningham et al. | |

* cited by examiner

*Primary Examiner* — John Kwon
(74) *Attorney, Agent, or Firm* — Julia Voutyras; Alleman Hall McCoy Russell & Tuttle LLP (57) ABSTRACT

A method and a system for providing vacuum via an engine are described. In one example, introduction of a gaseous fuel is ceased in response to a request for the engine to provide vacuum to a vehicle vacuum system.

7 Claims, 5 Drawing Sheets

METHOD AND SYSTEM FOR INCREASING VACUUM GENERATION BY AN ENGINE

CROSS REFERENCE TO RELATED APPLICATIONS

The present application is a divisional of U.S. patent application Ser. No. 13/944,728, entitled "METHOD AND SYSTEM FOR INCREASING VACUUM GENERATION BY AN ENGINE," filed on Jul. 17, 2013, the entire contents of which are hereby incorporated by reference for all purposes.

FIELD

The present description relates to a method and system for providing vacuum via an engine. The method and system may be particularly useful for increasing an amount of vacuum provided by an engine when the engine is operated at higher altitudes where barometric pressure is lower than barometric pressure at sea level.

BACKGROUND AND SUMMARY

A vehicle may operate over a wide range of environmental conditions. Some environmental conditions, such as altitude, may affect operation of some vehicle systems. For example, it may be more difficult for an engine to produce vacuum for the vehicle's vacuum system as the vehicle travels from a lower altitude where barometric pressure is higher to a higher altitude where barometric pressure is lower. Since barometric pressure is lower at higher altitudes, the engine may operate with substantially the same intake manifold pressure at equal torque but since atmospheric pressure is lower, intake manifold vacuum is reduced. Consequently, the engine may not be able to provide as deep of vacuum at altitude as compared to when the engine is operated at sea level. Therefore, the vehicle's vacuum system may not be able to provide as much vacuum assistance as is desired.

The inventors herein have recognized the above-mentioned issues and have developed a method for operating an engine, comprising: combusting an amount of a first fuel at an engine speed and load in absence of a vacuum request, the first fuel introduced to the engine in a gaseous state; and reducing the amount of the first fuel and increasing an amount of a second fuel introduced to the engine at the engine speed and load in response to presence of the vacuum request.

By reducing the amount of gaseous fuel supplied to an engine and substituting liquid fuel in place of the removed gaseous fuel, it may be possible to provide the technical result of increasing vacuum production by an engine. In particular, injection of liquid fuel rather than of gaseous fuel may allow an engine to operate with a deeper intake manifold vacuum while providing a same level of engine torque. This may be the case since liquid fuel displaces less volume in the engine's intake manifold, thereby allowing the engine to operate with a reduced MAP (e.g., deeper intake manifold vacuum). In some examples, the gaseous fuel may be a pressurized fuel such as compressed natural gas (CNG) or propane. In other examples, the gaseous fuel may be fuel vapors from gasoline that are introduced from the engine's crankcase or from a fuel vapor storage canister to the engine's intake system.

The present description may provide several advantages. For example, the approach may improve an engine's capacity to produce vacuum. Further, the approach may allow the vehicle to operate at higher altitudes while at the same time providing sufficient vacuum to operate the vehicle's vacuum actuators. Additionally, the approach may allow an engine to produce sufficient vacuum to enable further vacuum creation via an ejector.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
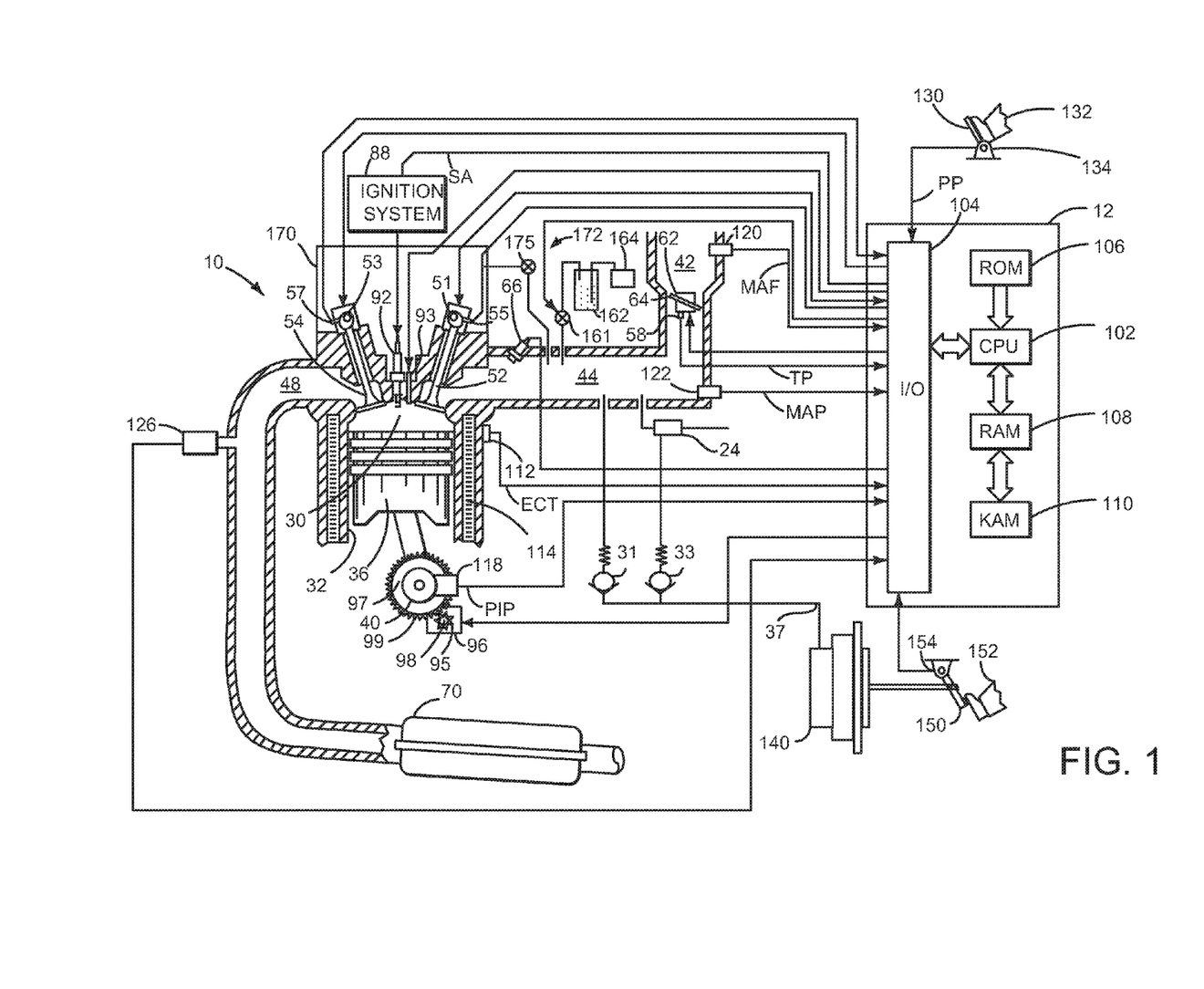
FIG. 1 is a schematic diagram of an engine.
Figure 2:
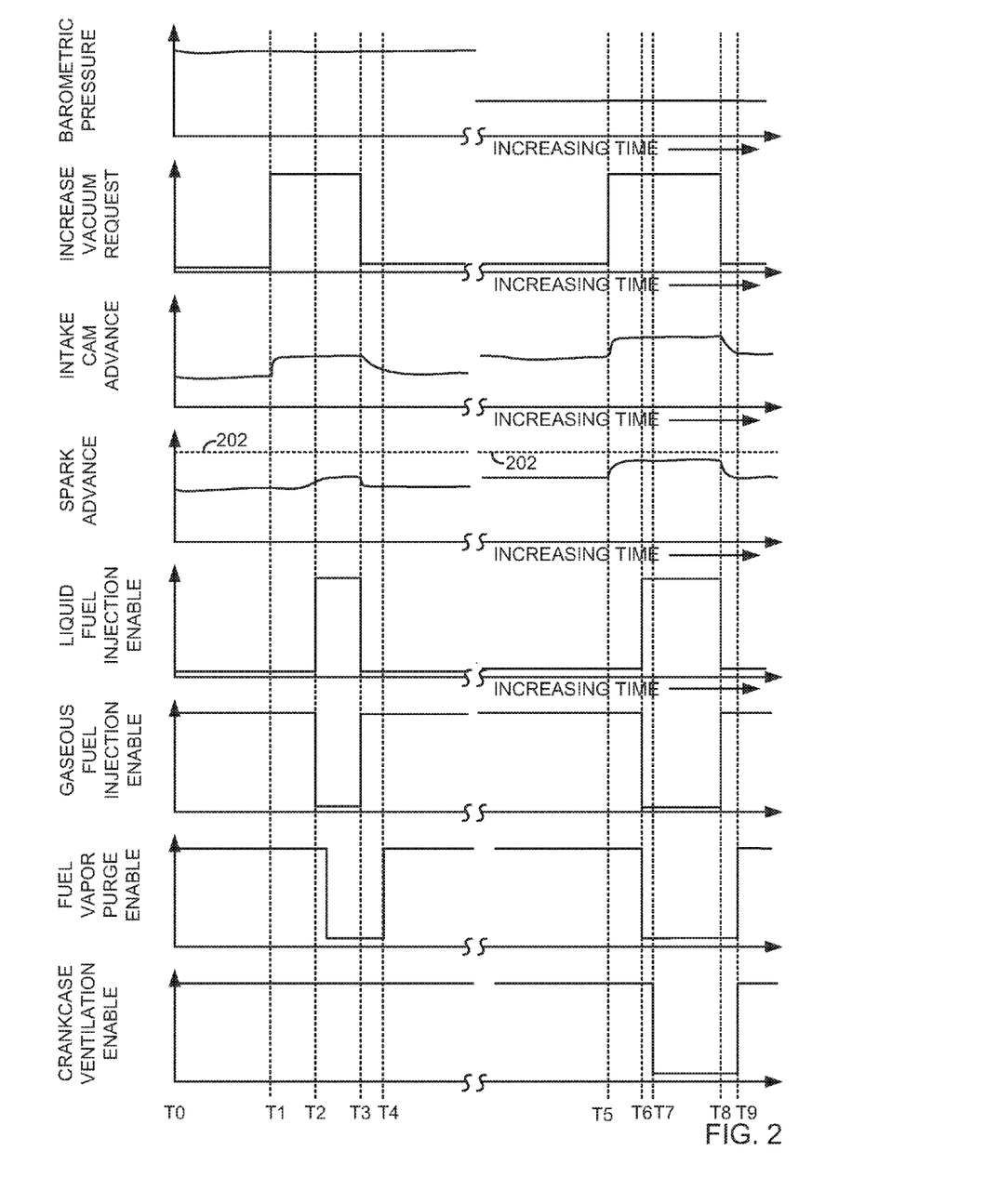
FIGS. 2 and 3 show example prophetic vehicle operating sequences.
Figure 3:
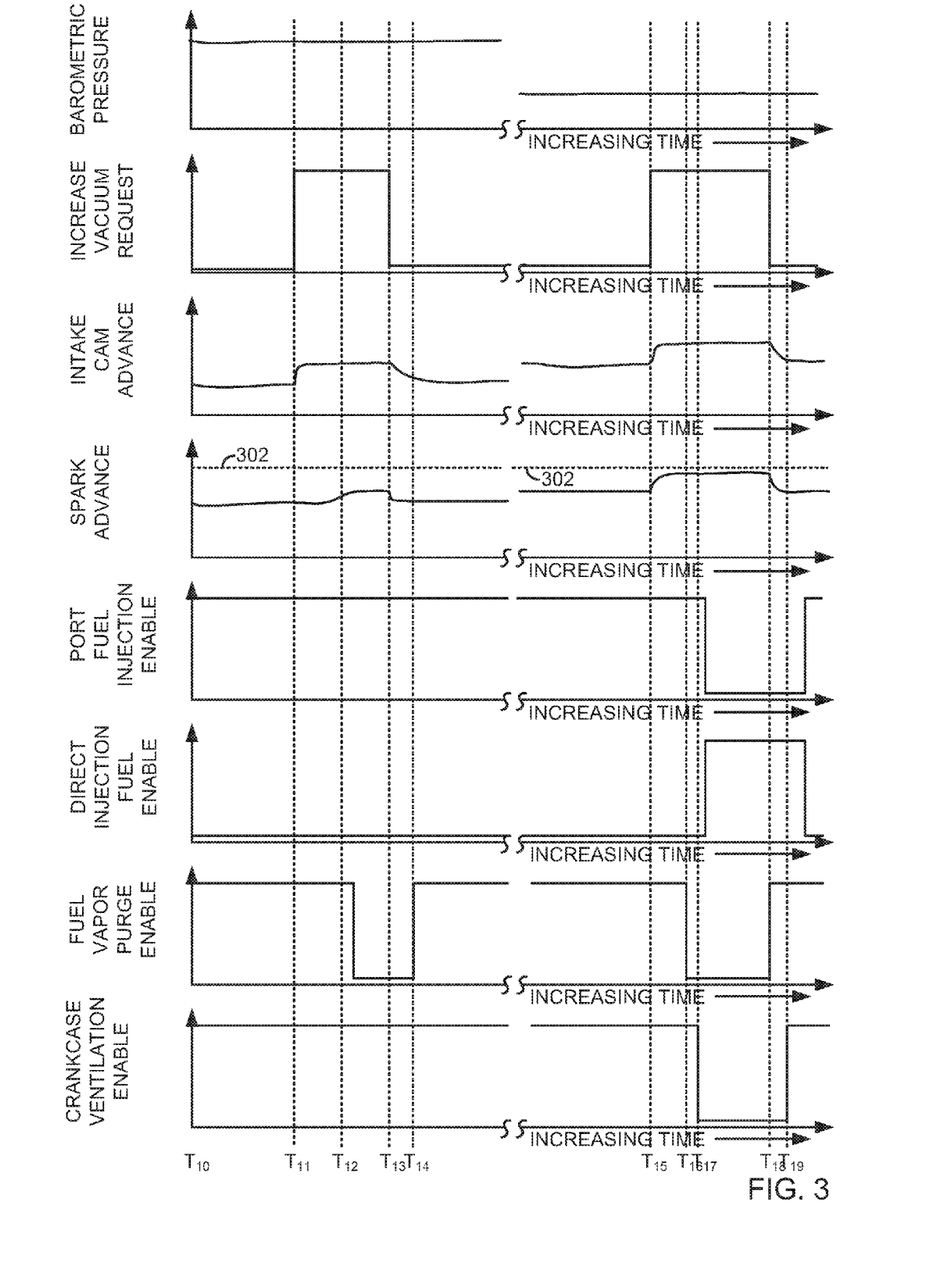

The present description is related to controlling a vehicle powertrain. The vehicle may include an engine as is shown in FIG. 1. The engine may operate as shown in FIGS. 2 and 3 to increase vacuum production by the engine. The methods of FIGS. 4 and 5 may be part of the system shown in FIG. 1 providing the operating sequences shown in FIGS. 2 and 3.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter motor 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. The valve cover 170 encloses intake cam 51 and exhaust cam 53.

Positive crankcase ventilation (PCV) system 172 includes PCV valve 175 which may selectively allow crankcase gases into intake manifold 44.

Fuel injector 66 is shown positioned to inject fuel into an intake port of cylinder 30, which is known to those skilled in the art as port fuel injection. Alternatively, fuel may be injected directly into a cylinder via direct injector 93, which is known to those skilled in the art as direct injection. Fuel injectors 66 and 93 deliver fuel in proportion to a pulse width signal from controller 12. Fuel injector 66 may inject gaseous or liquid fuel depending on the fuel system design. Likewise, fuel injector 93 may inject gaseous or liquid fuel depending on the fuel system design. In some examples, fuel injector 66 may inject a liquid fuel such as gasoline while fuel injector 93 injects a gaseous fuel, or vice-versa. Alternatively, fuel injector 93 and fuel injector 66 may supply the same type of fuel. In addition, intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Fuel vapors from fuel tank 164 may be stored in fuel vapor storage canister 162. Fuel vapor storage canister 162 may include carbon. Fuel vapor purge valve 161 may be selectively opened and closed to allow fuel vapors stored in fuel vapor storage canister 162 to enter intake manifold 44. Gasoline or a mixture of gasoline and alcohol may be stored in fuel tank 164.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Vehicle wheel brakes may be provided when brake pedal 150 is applied via foot 152. Brake pedal sensor 154 supplies a signal indicative of brake pedal position to controller 12. Foot 152 is assisted by brake booster 140 applying vehicle brakes. Vacuum may be provided to brake booster 140 via passage or conduit 37. Check valve 31 allows air to be drawn from brake booster 140 to intake manifold 44 and inhibits air flow from intake manifold 44 to brake booster 140. Ejector 24 may provide a deeper vacuum to brake booster 140 via check valve 33 during conditions of low vacuum in intake manifold 44. In some examples, ejector 24 may be supplied pressurized air via a compressor to increase vacuum production.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

The system of FIG. 1 provides for a vehicle system, comprising: an engine including a cylinder, a port fuel injector supplying fuel to the cylinder, a direct fuel injector supplying fuel to the cylinder, a crankcase ventilation system providing fuel to the cylinder; a fuel vapor storage canister providing fuel to the cylinder; and a controller including executable instructions stored in non-transitory memory, the executable instructions providing for activating the direct fuel injector and deactivating the port fuel injector in response to a request for vacuum.

In some examples, the vehicle system further comprises additional instructions for deactivating flow from the fuel vapor storage canister to the engine in response to the request for vacuum. The vehicle system further comprises additional instructions for deactivating flow from the crankcase ventilation system to the cylinder in response to the request for vacuum. The vehicle system includes where the direct fuel injector injects a liquid fuel and where the port fuel injector injects a gaseous fuel. The vehicle system includes where the gaseous fuel is compressed natural gas or propane, and where the liquid fuel is gasoline or liquid propane. The vehicle system further comprises a vacuum reservoir and additional instructions for activating or deactivating the request for vacuum in response to an amount of vacuum stored in the vacuum reservoir.

Referring now to FIG. 2, a prophetic engine operating sequence is shown. The sequence of FIG. 2 may be provided via the system of FIG. 1 operating according to the method of FIG. 4. FIG. 2 includes vertical markers T0-T9 which represent times of interest during the operating sequence. The SS markings along each of the X axis represent a brake in time for the sequence.

The first plot from the top of FIG. 2 represents barometric pressure versus time. The X axis represents time and time increases from the left side of FIG. 2 to the right side of FIG. 2. The Y axis represents barometric pressure and barometric pressure increases in the direction of the Y axis arrow.

The second plot from the top of FIG. 2 represents a request for increased vacuum in the vehicle's vacuum system. A request for vacuum may be based on a level of vacuum stored in a vacuum reservoir. The X axis represents time and time increases from the left side of FIG. 2 to the right side of FIG. 2. The Y axis represents vacuum request, and a request for vacuum is present when the trace is at a higher level near the Y axis arrow. The request for vacuum is not asserted when the trace is at a lower level near the X axis.

The third plot from the top of FIG. 2 represents intake cam advance versus time. The X axis represents time and time increases from the left side of FIG. 2 to the right side of FIG. 2. The Y axis represents intake cam advance and the intake cam is more advanced in the direction of the Y axis arrow. The base cam position opens intake valves after TDC intake stroke. Thus, advancing intake cam timing advances intake valve opening time toward TDC intake stroke or earlier. The intake cam timing advances further in the direction of the Y axis arrow. Horizontal line 202 represents MBT spark timing for the particular speed and load where the engine is operating.

The fourth plot from the top of FIG. 2 represents ignition spark timing advance versus time. The X axis represents time and time increases from the left side of FIG. 2 to the right side of FIG. 2. The Y axis represents ignition spark timing and spark timing is more advanced in the direction of the Y axis arrow. Horizontal line 202 represents minimum spark timing for best torque (MBT).

The fifth plot from the top of FIG. 2 represents an enable status for liquid fuel injection versus time. The X axis represents time and time increases from the left side of FIG. 2 to the right side of FIG. 2. The Y axis represents an enable status for liquid fuel injection. Specifically, liquid fuel injection is activated or enabled when the trace is at a higher level near the Y axis arrow. Liquid fuel injection is deactivated when the trace is at a lower level near the X axis. Liquid fuels are fuels that are injected to the engine in a liquid state. In some examples, a portion of the liquid fuel may evaporate during or after fuel injection (e.g., gasoline). However, the injected fuel remains a liquid injected fuel.

The sixth plot from the top of FIG. 2 represents an enable status for gaseous fuel injection versus time. The X axis represents time and time increases from the left side of FIG. 2 to the right side of FIG. 2. The Y axis represents an enable status for gaseous fuel injection. Specifically, gaseous fuel injection is activated or enabled when the trace is at a higher level near the Y axis arrow. Gaseous fuel injection is deactivated when the trace is at a lower level near the X axis. Gaseous fuels are fuels that are introduced to the engine in a gaseous state (e.g, CNG, propane, or $H_2$).

The seventh plot from the top of FIG. 2 represents an enable status for fuel vapor purging versus time. The X axis represents time and time increases from the left side of FIG. 2 to the right side of FIG. 2. The Y axis represents an enable status for fuel vapor purging. Specifically, fuel vapor purging is activated or enabled when the trace is at a higher level near the Y axis arrow. Fuel vapor purging is deactivated when the trace is at a lower level near the X axis. Fuel vapor purging may remove fuel vapors stored in a fuel vapor storage canister, such as a carbon canister. Fuel vapor purging may be provided via opening valve 161 of FIG. 1.

The eighth from the top of FIG. 2 represents an enable status for engine crankcase ventilation versus time. The X axis represents time and time increases from the left side of FIG. 2 to the right side of FIG. 2. The Y axis represents an enable status for engine crankcase ventilation. Specifically, engine crankcase ventilation is activated or enabled when the trace is at a higher level near the Y axis arrow. Engine crankcase ventilation is deactivated when the trace is at a lower level near the X axis. The engine crankcase may include hydrocarbon gases from engine fuel or oil that are vented to engine cylinders and combusted. Engine crankcase ventilation may be provided via opening valve 175 of FIG. 1.

At time T0, barometric pressure is at a higher level and there is no request for increased vacuum from the vehicle's vacuum system. The engine's intake cam is at a low level of advance and spark timing is at a middle level advance. Liquid fuel injection is deactivated and gaseous fuel injection is enabled. Additionally, fuel vapor purge and crankcase ventilation are both activated. Thus, at time T0 the engine is operating using solely gaseous fuel sources. Such operating conditions may be present when the engine is operating at middle level engine speeds and loads near sea level where barometric pressure may be higher due to low altitude.

At time T1, a request for an increase in vacuum from the vehicle's vacuum system is asserted while the engine continues to operate at a higher barometric pressure. The request for additional vacuum may be in response to a vacuum level in a vacuum reservoir in the vehicle's vacuum system. The intake cam timing is advanced in response to the vacuum request so that the intake valve closing time is advanced toward bottom dead center intake stroke. By closing the engine intake valves closer to bottom dead center intake stroke, less content from engine cylinders may be pushed back into the engine intake manifold so that intake manifold pressure may be reduced.

A group of the different engine actuators (e.g., intake cam timing, spark timing, liquid/gaseous fuel injection enable, fuel vapor purge, and crankcase ventilation) may be simultaneously adjusted to increase the engine's vacuum production, or the engine actuators may be adjusted one after the other as shown in FIG. 2. In one example where a group of engine actuators are adjusted simultaneously, each actuator is adjusted based on a difference between a vacuum level in the vacuum reservoir and a vacuum level in the engine intake manifold at the time of the vacuum request. In one example, a table or function outputs an empirically determined actuator adjustment based on the difference between a vacuum level in the vacuum reservoir and a vacuum level in the engine intake manifold at the time of the vacuum request. On the other hand, the sequence shown in FIG. 2 adjusts each actuator a predetermined amount in response to the request for vacuum, where the actuators adjustments occur successively, until a desired intake manifold vacuum is reached.

Engine spark advance is increased shortly after intake cam timing begins to be advanced so that the engine operates closer to minimum spark timing for best torque (MBT). By operating closer to MBT spark timing, it may be possible to provide additional engine torque using less fresh air so that the engine throttle may be closed to produce additional vacuum as spark timing is advanced. Gaseous fuel injection, fuel vapor purge, and crankcase ventilation remain activated at time T1. Liquid fuel injection remains deactivated at time T1. In this example, it is judged that engine intake manifold vacuum has not reached a desired vacuum level via advancing spark timing and cam timing before time T2.

At time T2, injection of gaseous fuel (e.g., CNG, propane, $H_2$) to the engine from a gaseous fuel storage tank is reduced to zero in response to the vacuum request and the present level of intake manifold vacuum. However, in some examples, injection of gaseous fuel may be ramped to a lower level other than a level of zero flow. By reducing flow of gaseous fuel into the engine intake manifold, it may be possible to operate the engine at a higher intake manifold vacuum since less manifold volume is displaced by gaseous fuel. Injection of liquid fuel is also activated at time T2. By injecting liquid fuel to the engine, less volume in the engine's intake manifold may be occupied by fuel vapors. Consequently, the engine may be operated to produce additional vacuum by ceasing or reducing a fraction of gaseous fuel being combusted and increasing a fraction of liquid fuel being combusted. It should be noted that there may be overlap between ceasing to inject gaseous fuel and beginning to inject liquid fuel to reduce engine torque disturbances and to improve air-fuel ratio control.

Shortly after time T2, fuel vapor purge is deactivated in response to the vacuum request and a vacuum level in the engine intake manifold. Fuel vapor purge removes fuel vapors from a fuel vapor storage canister (e.g., 162 of FIG. 1) so that fuel vapors are combusted rather than being released to atmosphere. By reducing fuel vapor purge, less engine intake manifold volume is occupied by fuel vapors so that the engine intake manifold may be operated at a higher vacuum level. In this example, the engine intake manifold vacuum reaches a desired vacuum level after fuel vapor purging is deactivated. Consequently, engine crankcase ventilation is allowed to continue so that crankcase vapors may be reduced.

At time T3, the request for increased vacuum for the vehicle's vacuum system changes state to not asserted in response to a vacuum level in the vacuum system's vacuum reservoir. Intake cam timing begins to be retard as does engine spark timing in response to the request for vacuum not being asserted. Additionally, liquid fuel injection is deactivated and gaseous fuel injection is activated in response to the request for vacuum not being asserted. Thus, the engine returns to a state of combusting gaseous fuel.

At time T4, fuel vapor purge is enabled as indicated by the fuel vapor purge enable trace changing state to a high level in response to the increase vacuum request not being asserted. Crankcase ventilation remains enabled as indicated by the crankcase ventilation enable signal remaining at a higher level.

It should be noted that the timing for activating and deactivating the various actuators may be adjusted compared to the timings shown to improve engine air-fuel control and torque control depending on fuel and engine characteristics. Further, the engine intake manifold vacuum may be increased to a desired level adjusting a fewer or greater number of actuators than those shown in FIG. 2.

Between time T4 and time T5, there is a break in the time line of FIG. 2. The break in time allows FIG. 2 to show differences in the way the engine is controlled at different altitudes (e.g., different barometric pressures) while the engine is operating at substantially the same engine speed and load. Thus, engine speed and load are the same from time T0 to time T9 in this example. However, barometric pressure is reduced from time T4 to time T5.

At time T5, the increase vacuum request changes state from a lower level to a higher level to request an increase in vacuum from the vehicle's vacuum system. The engine is operating at higher altitude and lower barometric pressure as compared to time T1. The engine intake cam timing and spark timing are advanced to lower engine intake manifold pressure. However, since less air is available at higher altitudes the engine throttle (not shown) is operated in a more open position just before time T5 as compared to time T0.

At time T6, engine intake manifold vacuum has not reached a desired vacuum level. Therefore, liquid fuel injection is enabled as indicated by the liquid fuel injection enable trace changing state to a higher level in response to the request for increased vacuum and the intake manifold vacuum level. Further, gaseous fuel injection is deactivated as indicated by the gaseous fuel injection enable trace changing state to a lower level in response to the request for increased vacuum and the intake manifold vacuum level. Additionally, the fuel vapor purge is deactivated as indicated by the fuel vapor purge enable trace transitioning to a lower level in response to the request for increased vacuum and the intake manifold vacuum level. Engine intake manifold vacuum has not reached a desired vacuum level after gaseous fuel injection and fuel vapor purge have been deactivated because the engine throttle is opened further because less air is available at higher altitudes.

At time T7, the crankcase ventilation enable trace transitions to a lower level to indicate that crankcase ventilation is deactivated in response to the request for increased vacuum and the engine intake manifold vacuum level. By deactivating crankcase ventilation, the engine intake manifold vacuum may be increased further in response to the request to increase vacuum and the intake vacuum level. The engine intake manifold vacuum is increased to a desired level by deactivating crankcase ventilation since less fuel vapor is displacing less intake manifold volume.

At time T8, the increase vacuum request transitions to a lower level to deactivate the request for additional vacuum in the engine's vacuum system. The request for additional vacuum may be deactivated, or not asserted, in response to a vacuum level in the vacuum system reservoir reaching a desired vacuum level. Intake cam timing and spark timing are retarded in response to the vacuum request being deactivated or not being asserted. Additionally, injection of gaseous fuel is enabled and injection of liquid fuel is deactivated in response to the increase vacuum request not being asserted. Of course, there may be overlap time between injecting gaseous fuel and ceasing to inject liquid fuel.

At time T9, fuel vapor purging and crankcase ventilation are reactivated in response to the increased vacuum request not being asserted as indicated by the fuel vapor purging and crankcase ventilation traces transitioning to higher states. Reactivating the fuel vapor purge and crankcase ventilation allows fuel vapors from within the engine and generated in the fuel tank to be combusted.

In this way, operation of different engine actuators may be adjusted to increase a vacuum level provided via engine intake manifold vacuum. Further, FIG. 2 shows that the engine may provide increased vacuum at higher altitudes by progressively increasing the number of actuators adjusted in response to a request for additional vacuum.

Referring now to FIG. 3, an engine operating sequence to increase vacuum produced via an engine intake manifold is shown. Many of the plots shown in FIG. 3 are of the same actuators described in FIG. 2. Therefore, for the sake of brevity, descriptions of already described plots are omitted and only new plots are described. The engine operating conditions are the same in FIG. 2 as the engine operating conditions shown in FIG. 3. Vertical markers T10-T19 represent times of interest in the sequence.

The horizontal line 302 in the third plot from the top of FIG. 3 represents MBT spark timing. Spark timing that approaches horizontal line 302 from the X axis is advancing.

The fifth plot from the top of FIG. 3 represents an enable status for port fuel injection versus time. The port fuel being injected may be gaseous or liquid. The X axis represents time and time increases from the left side of FIG. 3 to the right side of FIG. 3. The Y axis represents an enable status for port fuel injection. Specifically, port fuel injection is activated or enabled when the trace is at a higher level near the Y axis arrow. Port fuel injection is deactivated when the trace is at a lower level near the X axis. Deactivating port fuel injection may reduce the formation of fuel vapors in the engine intake manifold when the engine is combusting an air-fuel mixture. Consequently, the volume of an intake manifold being occupied by vaporized or gaseous fuel may be reduced.

The sixth plot from the top of FIG. 3 represents an enable status for direct fuel injection versus time. The direct fuel being injected may be gaseous or liquid. The X axis represents time and time increases from the left side of FIG. 3 to the right side of FIG. 3. The Y axis represents an enable status for direct fuel injection. Specifically, direct fuel injection is activated or enabled when the trace is at a higher level near the Y axis arrow. Direct fuel injection is deactivated when the trace is at a lower level near the X axis. Activating direct fuel injection may reduce the formation of fuel vapors in the engine intake manifold when the engine is combusting an air-fuel mixture since there is less chance of fuel vapors entering the engine intake manifold. In this way, the volume of intake manifold being occupied by vaporized or gaseous fuel may be reduced.

At time T10, barometric pressure is at a higher level and there is no request for increased vacuum for the vehicle's vacuum system. The engine's intake cam is at a low level of advance and spark timing is at a middle level advance. Direct fuel injection is deactivated and port fuel injection is enabled. Additionally, fuel vapor purge and crankcase ventilation are both activated. Thus, at time T10 the engine is combusting port injected fuel only. Such operating conditions may be present when the engine is operating at middle level engine speeds and loads near sea level where barometric pressure may be higher due to low altitude.

At time T11, a request for an increase in vacuum for the vehicle's vacuum system is asserted while the engine continues to operate at a higher barometric pressure. The request for additional vacuum may be in response to a vacuum level in a vacuum reservoir in the vehicle's vacuum system. The intake cam timing is advanced in response to the vacuum request so that the intake valve closing time is advanced toward bottom dead center intake stroke. By closing the engine intake valves closer to bottom dead center intake stroke, less content from engine cylinders may be pushed back into the engine intake manifold so that intake manifold pressure may be reduced.

A group of the different engine actuators (e.g., intake cam timing, spark timing, liquid/gaseous fuel injection enable, fuel vapor purge, and crankcase ventilation) may be simultaneously adjusted to increase the engine's vacuum production, or the engine actuators may be adjusted one after the other as shown in FIG. 3. However, the sequence shown in FIG. 3 adjusts each actuator a predetermined amount in response to the request for vacuum, where the actuators adjustments occur successively, until a desired intake manifold vacuum is reached.

Spark timing remains unchanged and port fuel injection, fuel vapor purge, and crankcase ventilation remain activated at time T11. Direct fuel injection remains deactivated at time T11. In this example, it is judged that engine intake manifold vacuum has not reached a desired vacuum level via advancing cam timing before time T12.

At time T12, engine spark timing for the engine is advanced toward MBT spark timing in response to the request for increased vacuum and the present engine vacuum level. By operating closer to MBT spark timing, it may be possible to provide additional engine torque using less fresh air so that the engine throttle may be closed, thereby increasing engine vacuum as spark timing is advanced.

Shortly after time T12, fuel vapor purge is deactivated in response to the vacuum request and a vacuum level in the engine intake manifold. Fuel vapor purge removes fuel vapors from a fuel vapor storage canister (e.g., 162 of FIG. 1) so that fuel vapors are combusted rather than being released to atmosphere. By reducing fuel vapor purge, less engine intake manifold volume is occupied by fuel vapors so that the engine intake manifold may be operated at a higher vacuum level. In this example, the engine intake manifold vacuum reaches a desired vacuum level after fuel vapor purging is deactivated. Consequently, engine crankcase ventilation and port fuel injection are allowed to remain active while port fuel injection remains deactivated.

At time T13, the request for increased vacuum for the vehicle's vacuum system changes state to not asserted in response to a vacuum level in the vacuum system's vacuum reservoir. Intake cam timing begins to be retard as does engine spark timing in response to the request for vacuum not being asserted. Thus, the engine returns to a state of combusting port injected fuel and fuel vapors from the engine crankcase.

At time T14, fuel vapor purge is enabled as indicated by the fuel vapor purge enable trace changing state to a high level in response to the increase vacuum request not being asserted.

It should be noted that the timing for activating and deactivating the various actuators may be adjusted compared to the timings shown to improve engine air-fuel control and torque control depending on fuel and engine characteristics. Further, the engine intake manifold vacuum may be increased to a desired level adjusting a fewer or greater number of actuators than those shown in FIG. 2.

Between time T14 and time T15, there is a break in the time line of FIG. 3. The break in time allows FIG. 3 to show differences in the way the engine is controlled at different altitudes (e.g., different barometric pressures) while the engine is operating at substantially the same engine speed and load. Thus, engine speed and load are the same from time T10 to time T19 in this example. However, barometric pressure is reduced from time T14 to time T15.

At time T15, the increase vacuum request changes state from a lower level to a higher level to request an increase in vacuum for the vehicle's vacuum system. The engine is operating at higher altitude and lower barometric pressure as compared to time T11. The engine intake cam timing and spark timing are advanced to lower engine intake manifold pressure. However, since less air is available at higher altitudes the engine throttle (not shown) is operated in a more open position just before time T15 as compared to time T10.

At time T16, engine intake manifold vacuum has not reached a desired vacuum level. Therefore, fuel vapor purge is deactivated as indicated by the fuel vapor purge enable trace transitioning to a lower level in response to the request for increased vacuum and the intake manifold vacuum level. Engine intake manifold vacuum has not reached a desired vacuum level after fuel vapor purge has been deactivated because the engine throttle is opened further because less air is available at higher altitudes.

At time T17, the crankcase ventilation enable trace transitions to a lower level to indicate that crankcase ventilation is deactivated in response to the request for increased vacuum and the engine intake manifold vacuum level. By deactivating crankcase ventilation, the engine intake manifold vacuum may be increased further in response to the request to increase vacuum and the intake vacuum level. The engine intake manifold vacuum is still not increased to a desired level by deactivating crankcase ventilation. Therefore, direct fuel injection is activated and the amount of directly injected fuel is increased to engine cylinders. Further, the amount of fuel port injected to engine cylinders is decreased or port injection to engine cylinders may be deactivated. As a result, less fuel vapor may be present in the engine intake manifold so that the engine may produce additional vacuum. In this example, the engine intake manifold reaches a desired intake manifold vacuum after port fuel injectors are deactivated and after direct fuel injectors are activated. The engine continues to combust air-fuel at time T17.

At time T18, the increase vacuum request transitions to a lower level to deactivate the request for addition vacuum in the engine vacuum system. The request for additional vacuum may be deactivated, or not asserted, in response to a vacuum level in the vacuum system reservoir reaching a desired vacuum level. Intake cam timing and spark timing are retarded in response to the vacuum request being deactivated or not being asserted. Additionally, fuel vapor purging is reactivated as indicated by the fuel vapor purge enable trace transitioning to a higher level.

At time T19, port fuel injection and crankcase ventilation are reactivated in response to the increased vacuum request not being asserted as indicated by the port fuel injection enable and crankcase ventilation traces transitioning to higher states. Additionally, direct injection is deactivated. Reactivating crankcase ventilation allows fuel vapors from within the engine to be combusted.

In this way, operation of different engine actuators may be adjusted to increase a vacuum level provided via engine intake manifold vacuum. Further, FIG. 3 shows that the engine may provide increased vacuum at higher altitudes by progressively increasing the number of actuators adjusted in response to a request for additional vacuum.

Figure 4:
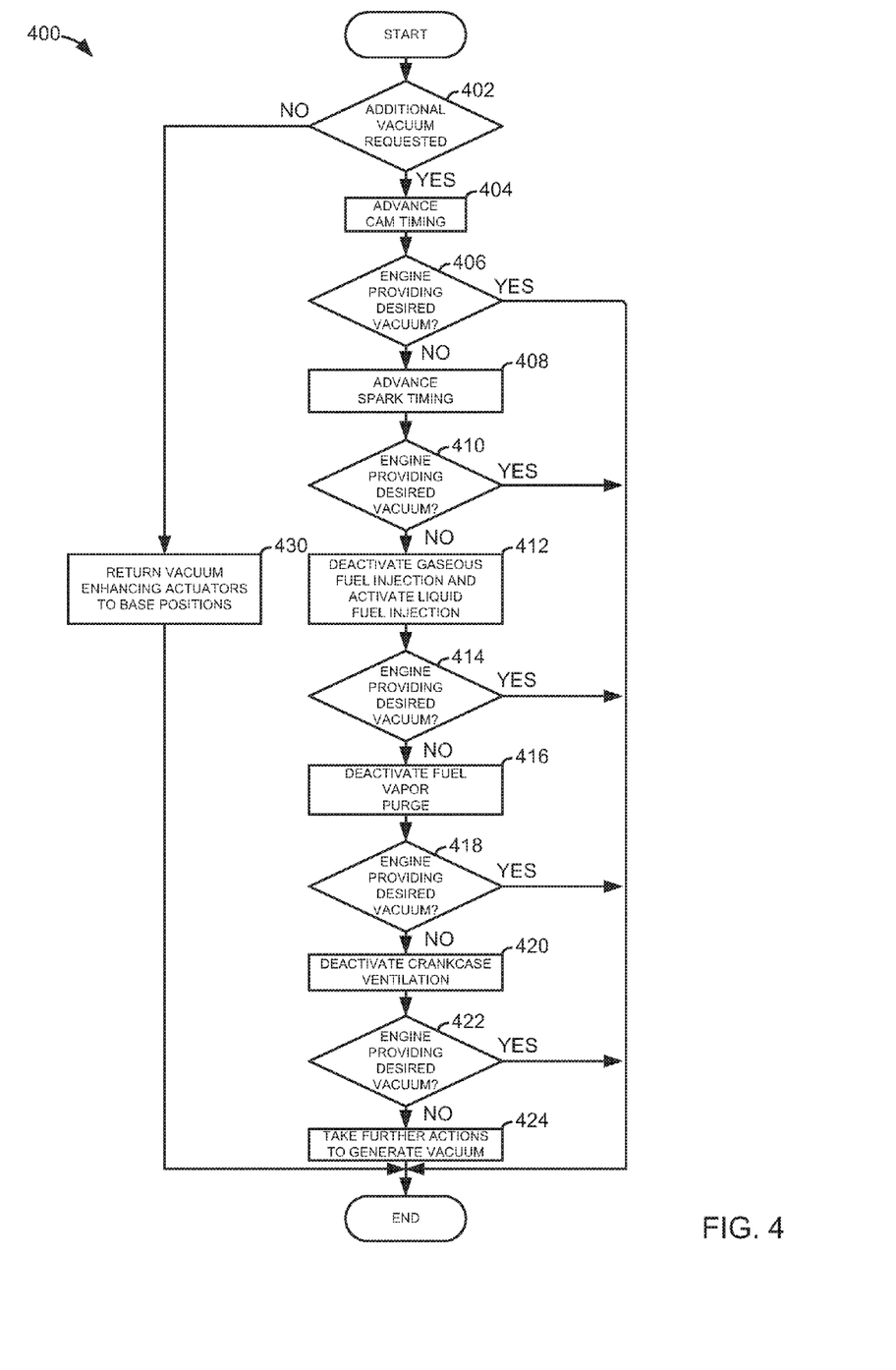
FIG. 4 shows a first method for increasing engine vacuum production.

Referring now to FIG. 4, a first method for increasing engine vacuum production is shown. The method of FIG. 4 may be used with the method of FIG. 5. Further, the method of FIG. 4 may be incorporated as executable instructions stored in non-transitory memory of the system shown in FIG. 1. Additionally, the method of FIG. 4 may provide the operating sequence shown in FIG. 2.

At 402, method 400 judges whether or not additional vacuum for the vehicle vacuum system is requested. In one example, a request for determining whether or not additional vacuum is being requested is determined from a level of a variable stored in memory. If method 400 judges that increased vacuum is being requested, the answer is yes and method 400 proceeds to 404. Otherwise, the answer is no and method 400 proceeds to 430.

At 430, method 400 returns the operating states of all actuators that have been adjusted to the actuator's base position (e.g., the actuator's position during the same operating conditions where increased vacuum is not requested). For example, if a port fuel injector has been deactivated and a direct fuel injector has been activated in response to a request for increased vacuum, the port fuel injector is activated and the direct fuel injector is deactivated. Method 400 proceeds to exit after operation of all actuators that were adjusted to increase engine vacuum are returned to their base operating states.

At 404, method 400 increases engine intake cam timing advance. In one example, the engine intake cam timing advance adjustment for the present operating conditions during a request for increased vacuum is empirically determined and stored in a table or function. The engine's base intake cam timing is advanced based on output from the table or function. In one example, the difference between vacuum system vacuum reservoir vacuum level and intake manifold vacuum level is used to index the table or function. Method 400 proceeds to 406 after intake cam timing is advanced.

At 406, method 400 judges whether or not the engine is providing a desired level of vacuum and if additional vacuum for the vehicle vacuum system is requested. If vacuum in the engine's intake manifold is less than a threshold vacuum and the request for increased vacuum is present, the answer is yes and method 400 proceeds to 408. Otherwise, the answer is no and method 400 proceeds to exit so that further actuator adjustments are not provided.

At 408, method 400 increases engine spark timing advance. In one example, the spark timing advance adjustment for the present operating conditions during a request for increased vacuum is empirically determined and stored in a table or function. The engine's base spark timing is advanced based on output from the table or function. In one example, the difference between vacuum system vacuum reservoir vacuum level and intake manifold vacuum level is used to index the table or function. Method 400 proceeds to 410 after engine spark timing is advanced.

At 410, method 400 judges whether or not the engine is providing a desired level of vacuum and if additional vacuum for the vehicle vacuum system is requested. If vacuum in the engine's intake manifold is less than a threshold vacuum and the request for increased vacuum is present, the answer is yes and method 400 proceeds to 412. Otherwise, the answer is no and method 400 proceeds to exit so that further actuator adjustments are not provided.

At 412, method 400 deactivates gaseous fuel injectors and activates liquid fuel injectors. Alternatively, method 400 may reduce and amount of fuel injected via gaseous fuel injectors and increase an amount of fuel injected via liquid fuel injectors. By increasing the amount of liquid fuel injected, the engine may provide the same torque at the same engine speed at a higher intake manifold vacuum. Method 400 proceeds to 414 after gaseous fuel injectors are deactivated and liquid fuel injectors are activated.

At 414, method 400 judges whether or not the engine is providing a desired level of vacuum and if additional vacuum for the vehicle vacuum system is requested. If vacuum in the engine's intake manifold is less than a threshold vacuum and the request for increased vacuum is present, the answer is yes and method 400 proceeds to 416. Otherwise, the answer is no and method 400 proceeds to exit so that further actuator adjustments are not provided.

At 416, method 400 deactivates fuel vapor purge. Fuel vapor purge may be deactivated via closing a valve between the engine air intake and a fuel vapor storage canister. Method 400 proceeds to 418 after fuel vapor purge is deactivated.

At 418, method 400 judges whether or not the engine is providing a desired level of vacuum and if additional vacuum for the vehicle vacuum system is requested. If vacuum in the engine's intake manifold is less than a threshold vacuum and the request for increased vacuum is present, the answer is yes and method 400 proceeds to 420. Otherwise, the answer is no and method 400 proceeds to exit so that further actuator adjustments are not provided.

At 420, method 400 deactivates crankcase ventilation. Crankcase ventilation may be deactivated via closing a valve between the engine air intake and an interior region of the engine (e.g., inside a valve cover or an engine crankcase). Method 400 proceeds to 420 after crankcase ventilation is deactivated.

At 422, method 400 judges whether or not the engine is providing a desired level of vacuum and if additional vacuum for the vehicle vacuum system is requested. If vacuum in the engine's intake manifold is less than a threshold vacuum and the request for increased vacuum is present, the answer is yes and method 400 proceeds to 424. Otherwise, the answer is no and method 400 proceeds to exit so that further actuator adjustments are not provided.

At 424, method 400 adjusts additional actuators to increase vacuum production via an engine. For example, the engine front end accessories may be shed or declutched from the engine to increase engine vacuum production. In another example, charge motion control valves may be opened in response to a request to produce additional vacuum. Method 400 proceeds to exit after adjustment of additional actuators to increase engine vacuum has begun.

Figure 5:
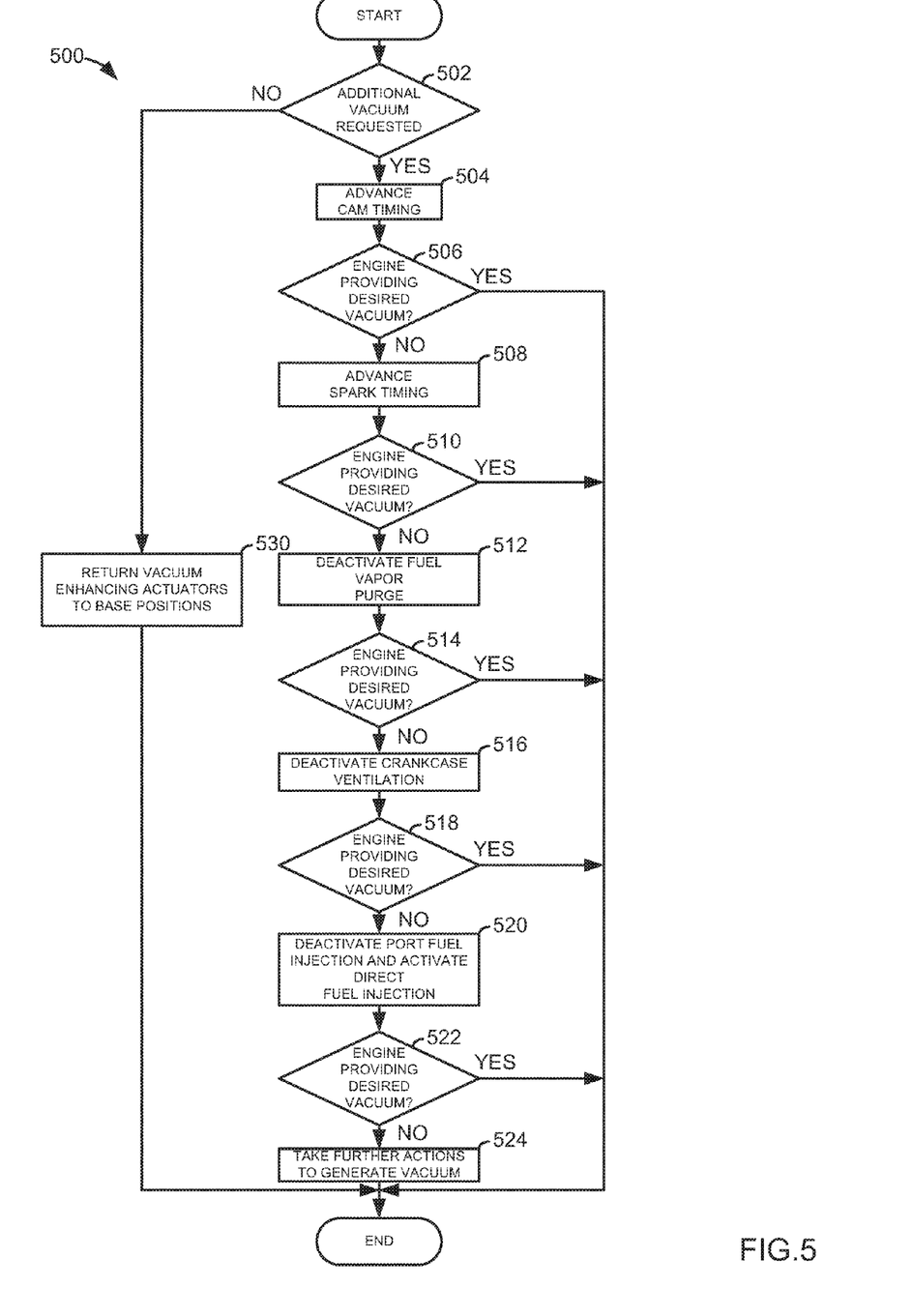
FIG. 5 shows a second method for increasing engine vacuum production.

Referring now to FIG. 5, a second method for increasing engine vacuum production is shown. The method of FIG. 5 may be used with the method of FIG. 4. Further, the method of FIG. 5 may be incorporated as executable instructions stored in non-transitory memory of the system shown in FIG. 1. Additionally, the method of FIG. 5 may provide the operating sequence shown in FIG. 3.

At 502, method 500 judges whether or not additional vacuum for the vehicle vacuum system is requested. In one example, a request for determining whether or not additional vacuum is being requested is determined from a level of a variable stored in memory. If method 500 judges that increased vacuum is being requested, the answer is yes and method 500 proceeds to 504. Otherwise, the answer is no and method 500 proceeds to 530.

At 530, method 500 returns the operating states of all actuators that have been adjusted to the actuator's base position (e.g., the actuator's position during the same operating conditions where increased vacuum is not requested). For example, if a port fuel injector has been deactivated and a direct fuel injector has been activated in response to a request for increased vacuum, the port fuel injector is activated and the direct fuel injector is deactivated. Method 500 proceeds to exit after operation of all actuators that were adjusted to increase engine vacuum are returned to their base operating states.

At 504, method 500 increases engine intake cam timing advance. In one example, the engine intake cam timing advance adjustment for the present operating conditions during a request for increased vacuum is empirically determined and stored in a table or function. The engine's base intake cam timing is advanced based on output from the table or function. In one example, the difference between vacuum system vacuum reservoir vacuum level and intake manifold vacuum level is used to index the table or function. Method 500 proceeds to 506 after intake cam timing is advanced.

At 506, method 500 judges whether or not the engine is providing a desired level of vacuum and if additional vacuum for the vehicle vacuum system is requested. If vacuum in the engine's intake manifold is less than a threshold vacuum and the request for increased vacuum is present, the answer is yes and method 500 proceeds to 508. Otherwise, the answer is no and method 500 proceeds to exit so that further actuator adjustments are not provided.

At 508, method 500 increases engine spark timing advance. In one example, the spark timing advance adjustment for the present operating conditions during a request for increased vacuum is empirically determined and stored in a table or function. The engine's base spark timing is advanced based on output from the table or function. In one example, the difference between vacuum system vacuum reservoir vacuum level and intake manifold vacuum level is used to index the table or function. Method 500 proceeds to 510 after engine spark timing is advanced.

At 510, method 500 judges whether or not the engine is providing a desired level of vacuum and if additional vacuum for the vehicle vacuum system is requested. If vacuum in the engine's intake manifold is less than a threshold vacuum and the request for increased vacuum is present, the answer is yes and method 500 proceeds to 512. Otherwise, the answer is no and method 500 proceeds to exit so that further actuator adjustments are not provided.

At 512, method 500 deactivates fuel vapor purge. Fuel vapor purge may be deactivated via closing a valve between the engine air intake and a fuel vapor storage canister. Method 500 proceeds to 514 after fuel vapor purge is deactivated.

At 514, method 400 judges whether or not the engine is providing a desired level of vacuum and if additional vacuum for the vehicle vacuum system is requested. If vacuum in the engine's intake manifold is less than a threshold vacuum and the request for increased vacuum is present, the answer is yes and method 500 proceeds to 516. Otherwise, the answer is no and method 500 proceeds to exit so that further actuator adjustments are not provided.

At 516, method 500 deactivates crankcase ventilation. Crankcase ventilation may be deactivated via closing a valve between the engine air intake and an interior region of the engine (e.g., inside a valve cover or an engine crankcase). Method 500 proceeds to 518 after crankcase ventilation is deactivated.

At 518, method 400 judges whether or not the engine is providing a desired level of vacuum and if additional vacuum for the vehicle vacuum system is requested. If vacuum in the engine's intake manifold is less than a threshold vacuum and the request for increased vacuum is present, the answer is yes and method 500 proceeds to 520. Otherwise, the answer is no and method 400 proceeds to exit so that further actuator adjustments are not provided.

At 520, method 500 deactivates port fuel injectors and activates direct fuel injectors. Alternatively, method 500 may reduce and amount of fuel injected via port fuel injectors and increase an amount of fuel injected via direct fuel injectors. By increasing the amount of direct fuel injected, the engine may provide the same torque at the same engine speed at a higher intake manifold vacuum. Method 500 proceeds to 522 after port fuel injectors are deactivated and direct fuel injectors are activated.

At 522, method 500 judges whether or not the engine is providing a desired level of vacuum and if additional vacuum for the vehicle vacuum system is requested. If vacuum in the engine's intake manifold is less than a threshold vacuum and the request for increased vacuum is present, the answer is yes and method 500 proceeds to 524. Otherwise, the answer is no and method 500 proceeds to exit so that further actuator adjustments are not provided.

At 524, method 500 adjusts additional actuators to increase vacuum production via an engine. For example, the engine front end accessories may be shed or declutched from the engine to increase engine vacuum production. In another example, charge motion control valves may be opened in response to a request to produce additional vacuum. Method 500 proceeds to exit after adjustment of additional actuators to increase engine vacuum has begun.

It should be noted that the methods of FIGS. 4 and 5 show engine vacuum increasing actuators being adjusted sequentially, one at a time. However, it may also possible to adjust a group of engine vacuum increasing actuators at the same time to reduce the amount of time it takes the engine to provide a desired vacuum.

The methods of FIGS. 4 and 5 may be used together when the engine system includes gaseous fuel injectors, liquid fuel injectors, direct fuel injectors, and port fuel injectors. For example, gaseous fuel may be injected via a port fuel injector while gasoline may be injected via direct injector. Alternatively, liquid fuel may be injected via a port fuel injector while gaseous fuel is injected via a direct fuel injector.

Thus, the methods of FIGS. 4 and 5 provide for operating an engine, comprising: combusting an amount of a first fuel at an engine speed and load in absence of a vacuum request, the first fuel introduced to the engine in a gaseous state; and reducing the amount of the first fuel and increasing an amount of a second fuel introduced to the engine at the engine speed and load in response to presence of the vacuum request. The method includes where the second fuel is introduced to the engine in a liquid state.

In some examples, the method includes where the amount of the first fuel is reduced to substantially zero (e.g., less than 3% of the rated injector flow rate) in response to the presence of the vacuum request. The method includes where the first fuel is compressed natural gas, hydrogen, or propane, and where the first fuel is injected to the engine. The method includes where the second fuel is gasoline and where the vacuum request is based on an amount of vacuum stored in a vacuum reservoir. The method further comprises advancing intake valve timing in response to the presence of the vacuum request. The method includes where the first fuel is a fuel that is stored in a canister that holds carbon.

The methods of FIGS. 4 and 5 also provide for operating an engine, comprising: injecting fuel to a cylinder of the engine via a port injector or a direct injector in absence of a vacuum request; and deactivating the port injector and operating the direct injector in presence of the vacuum request. The method includes where the port and direct injectors inject a liquid fuel. The method includes where the port and direct injectors inject a gaseous fuel. The method further comprises ceasing to provide a gaseous fuel to the engine in response to the presence of the vacuum request. The method includes where the gaseous fuel is provided via a crankcase of the engine. The method includes where the gaseous fuel is provided via a carbon canister. The method further comprises selectively deactivating a plurality of gaseous fuel sources in response to the presence of the vacuum request.

As will be appreciated by one of ordinary skill in the art, methods described in FIGS. 4 and 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
  combusting an amount of a first fuel at an engine speed and load in absence of a vacuum request, the first fuel introduced to the engine in a gaseous state; and
  reducing the amount of the first fuel and increasing an amount of a second fuel introduced to the engine at the engine speed and load in response to presence of the vacuum request.

2. The method of claim 1, where the second fuel is introduced to the engine in a liquid state.

3. The method of claim 1, where the amount of the first fuel is reduced to substantially zero in response to the presence of the vacuum request.

4. The method of claim 1, where the first fuel is compressed natural gas, hydrogen, or propane, and where the first fuel is injected to the engine.

5. The method of claim 1, where the second fuel is gasoline and where the vacuum request is based on an amount of vacuum stored in a vacuum reservoir.

6. The method of claim 1, further comprising advancing intake valve timing in response to the presence of the vacuum request.

7. The method of claim 1, where the first fuel is a fuel that is stored in a canister that holds carbon.

* * * * *